(12) United States Patent
Moore

(10) Patent No.: US 6,394,681 B1
(45) Date of Patent: May 28, 2002

(54) APPLICATOR ASSEMBLY

(76) Inventor: Rex Warren Moore, 8 Spinaker Drive, Whitby, Wellington (NZ)

(*) Notice: Subject to any disclaimer, the term of this patent is extended or adjusted under 35 U.S.C. 154(b) by 0 days.

(21) Appl. No.: 09/523,618

(22) Filed: Mar. 13, 2000

(30) Foreign Application Priority Data

Jul. 9, 1999 (NZ) ................................................ 336679

(51) Int. Cl.$^7$ ............................................. B43M 11/02
(52) U.S. Cl. ...................... 401/218; 401/197; 401/208; 401/193
(58) Field of Search ................................. 401/218, 208, 401/220, 5, 14, 48, 193, 197; 492/16, 17, 19

(56) References Cited

U.S. PATENT DOCUMENTS

| | | | |
|---|---|---|---|
| 1,075,941 A | | 10/1913 | Reed |
| 2,732,575 A | * | 1/1956 | Faust ............................. 401/5 |
| 2,763,022 A | | 9/1956 | Glacken |
| 2,932,045 A | | 4/1960 | Rabelow ................... 15/132.5 |
| 2,979,757 A | | 4/1961 | Smith ........................... 15/569 |
| 3,076,995 A | | 2/1963 | Rabelow ....................... 15/562 |
| 3,184,888 A | | 5/1965 | Fruth et al. .................... 47/1.5 |
| 3,349,462 A | * | 10/1967 | Mott ........................... 492/16 |
| 3,520,628 A | * | 7/1970 | Moceri ........................ 401/48 |
| 3,537,800 A | * | 11/1970 | Moceri ....................... 401/193 |
| 3,651,600 A | | 3/1972 | Ewing ........................... 47/1.5 |
| 4,027,986 A | | 6/1977 | Patrick ....................... 401/138 |
| 4,104,210 A | | 8/1978 | Coran et al. ................. 260/4 R |
| 4,467,509 A | * | 8/1984 | Dezen ......................... 492/19 |
| 4,524,805 A | | 6/1985 | Hoffman |
| 5,897,828 A | | 4/1999 | Sillince et al. |

FOREIGN PATENT DOCUMENTS

| | | |
|---|---|---|
| AU | 70087 | 5/1981 |
| AU | A-57062/86 | 11/1986 |
| AU | B-57624/86 | 11/1987 |
| AU | A-21859/88 | 3/1989 |
| GB | 1085635 | 10/1967 |
| GB | 2 160 402 A | 12/1985 |
| NZ | 194198 | 3/1984 |
| NZ | 286054 | 2/1996 |
| WO | WO 82/02997 | 9/1982 |
| WO | WO 95/29767 | 9/1995 |
| WO | WO 98/23388 | 6/1998 |
| WO | WO 98/42187 | 10/1998 |

\* cited by examiner

*Primary Examiner*—David J. Walczak
(74) *Attorney, Agent, or Firm*—Workman, Nydegger & Seeley

(57) ABSTRACT

A herbicide applicator assembly (10) includes a liquid applicator (14) in the form of a resiliently compressible, unitary, porous foam mass with a substantially cylindrical applicator surface (20) for applying liquid from a source thereof. The liquid applicator (14) is rotatably mounted. A spacer wheel (30) extends radially beyond the applicator surface (20) to space the applicator surface (20) from any flat surface with which the spacer wheel (30) is engaged. The spacer wheel (30) is in fixed connection with a bush (52) with the liquid applicator (14) seated on the external periphery of the bush (52). The liquid applicator (14) is attached to the spacer wheel (30) to rotate in unison with the spacer wheel (30). The liquid applicator (14) is provided with an external edge (42) defined between the substantially cylindrical applicator surface (20) and an end surface (40) of the applicator (14). The applicator surface (20) and the end surface (40) are exposed at least adjacent to the external edge (42) along at least a portion of the external edge (42).

25 Claims, 8 Drawing Sheets

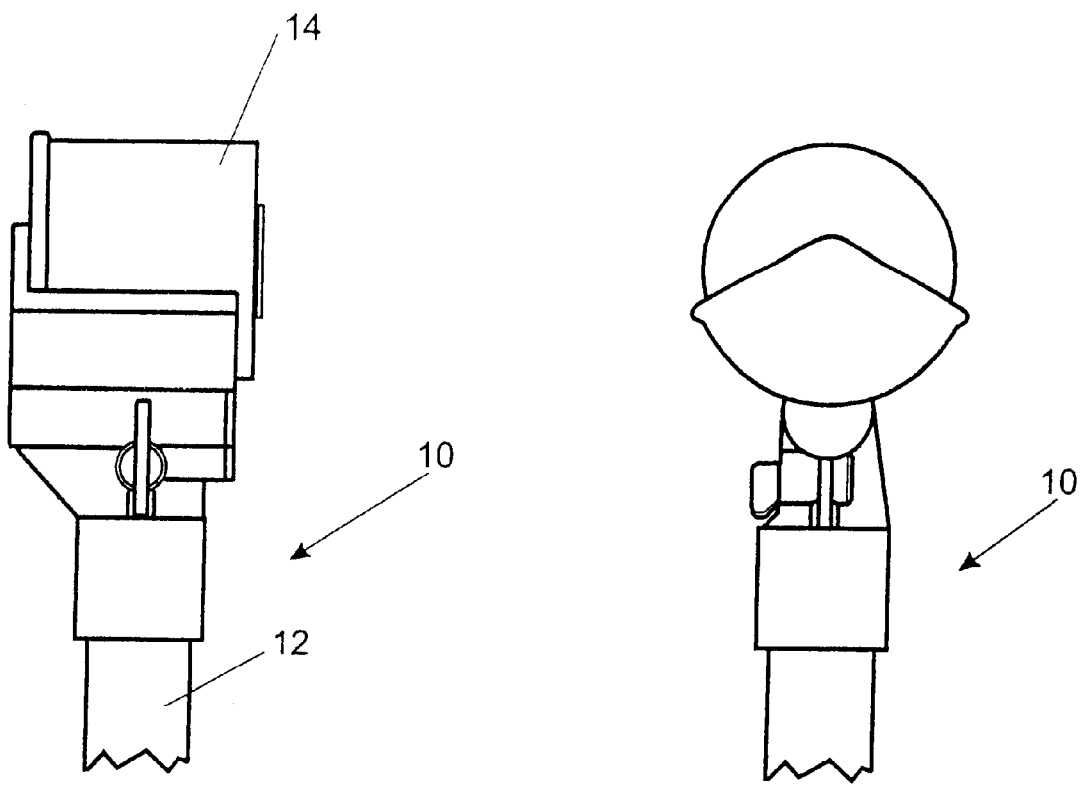
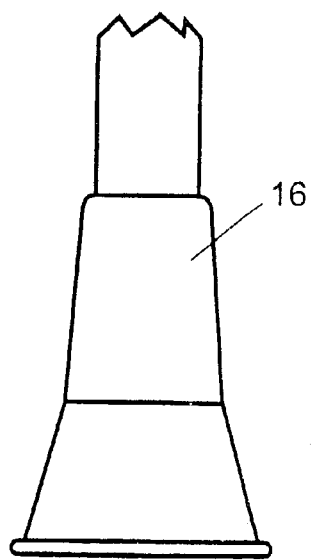
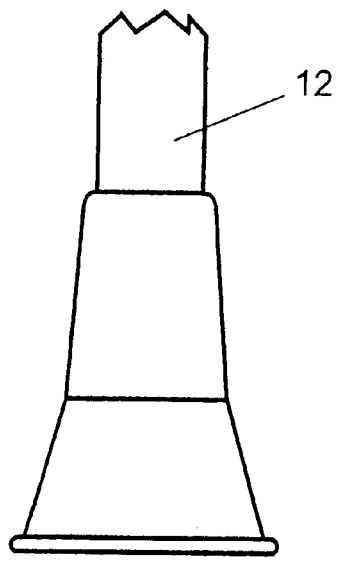
FIG. 1 FIG. 2

APPLICATOR ASSEMBLY

FIELD OF THE INVENTION

The present invention relates to a liquid applicator assembly. In particular, although not exclusively, the invention relates to a liquid applicator assembly for topically administering herbicide to weeds by the use of a hand held device with a long stem held at one end by the user, with a roller applicator at the other end. The applicator assembly is not limited to manual applicator devices. Additionally, while the applicator assembly illustrated in the drawings is intended for domestic use, the device may be adapted for commercial and agricultural use.

BACKGROUND TO THE INVENTION

Weeds have long been the scorn of the home gardener and manual removal is time consuming and tedious. Chemicals applied by spraying weeds is effective and less time consuming but there are health risks associated with applying herbicides in this manner. Additionally, plants not intended to be destroyed by the herbicide can unintentionally be damaged or destroyed. The application of herbicides by spraying also results in wastage of the herbicide, particularly where the spraying is conducted to eradicate weeds growing sparsely up through cracks in concrete or roadways, As an alternative method of applying liquid herbicides, International Patent Specification No. WO98/42187 assigned to Green Management Limited describes a roller applicator having an elongate tubular stem able to be held by the user at one end with a roller applicator provided at the other end in the shape of a large ball. The roller applicator is constructed of porous resiliently compressible foam material. The tubular stem acts as a reservoir for the liquid herbicide. The liquid herbicide is delivered in a controlled manner to the ball for surface application of the herbicide to weeds as the ball is rolled along the ground surface.

This product suffers from a number of shortcomings. Since the ball has a large surface area which is in direct contact with the ground surface, the ball delivers a large amount of herbicide to the ground/concrete/road etc irrespective of whether there are weeds present on the surface. Additionally, continual contact with the ground surface causes substantial wear on the ball.

Another shortcoming is that the shape of the ball precludes it from gaining access to tight corners. Consider for example garden beds and other densely growing garden areas.

Also, its size and shape make it difficult to accurately effect spot weeding by simply dabbing herbicide from the applicator onto plants/weeds which the user decides to eradicate. Moreover, in view of the awkward shape of the ball applicator, it is difficult for the user to be selective about the plants to which the herbicide is applied. The applicator will likely kill all in its path. The large ball is also expensive to manufacture, partly because of its awkward shape requiring it to be moulded into shape and partly because of the large amount of compressible foam material required for its construction.

Another shortcoming is the difficulty in draining the liquid contained in the tubular stem. An air valve is provided to avoid a vacuum being formed in which case the stem will not drain. However this air valve is ineffective to enable full drainage of the stem and the stem requires continual filling to maintain the flow rate. This can be resolved with the stem opened to the atmosphere but with the consequent risk of spilling the contents and losing the cap. No air valves are known to resolve this problem at a reasonable cost. Moreover, it has been found that the valve provided in the above device is not temperature stable and does not operate below about 8 degrees Celsius.

Yet another problem with the above device is caused by the glue used to connect some of its component parts. The glue gives off solvents in vapour form which attack some of the plastics in the device. Especially vulnerable is a valve which controls the flow to the applicator ball.

It is therefore an object of the present invention to address at least some of the foregoing disadvantages or at least provides the public with a usefuil choice.

SUMMARY OF THE INVENTION

In accordance with a first aspect of the present invention there is provided an applicator assembly including:

a liquid applicator which is rotatably mounted on the applicator assembly, the liquid applicator having a substantially cylindrical applicator surface for applying liquid from a source thereof;

a spacer means extending radially beyond the applicator surface in a manner effective to space the applicator surface from any flat surface with which the spacer means is engaged, wherein the liquid applicator is provided with an external edge defined between the substantially cylindrical applicator surface and an end surface of the applicator, said applicator surface and said end surfaces being exposed at least adjacent to the external edge along at least a portion of the external edge.

The invention thus defines a free edge not encumbered by either the spacer means or any other part of the applicator assembly, enabling the free edge to be used as a spot applicator. This increases the versatility of the applicator assembly whose primary function is as a roller applicator.

In a preferred form of the invention, the spacer means is provided at the end of the applicator opposite the exposed end surface. The spacer means may extend radially only a short distance (2–5 mm) beyond the applicator surface. Preferably, the spacer means is a substantially planar member. The spacer means may present a continuous peripheral surface extending radially beyond the applicator surface. Alternatively, the spacer means may be discontinuous like teeth provided on a gear wheel.

The spacer means may be in the form of a spacer wheel rotatably mounted on the applicator assembly. Moreover, a gripping surface may be provided along the peripheral edge of the spacer wheel to engage with the ground for rotation of the spacer wheel. The spacer means is preferably a wear resistant material such as a polycarbonate plastic. In a preferred form of the invention, the liquid applicator and the spacer wheel move in unison. Accordingly, the spacer wheel and the liquid applicator may be attached to each other. In a most preferred form of the invention, the spacer wheel has inwardly extending spikes to penetrate the liquid applicator to enable the spacer wheel and the liquid applicator to move as a unitary assembly.

Preferably, the liquid applicator and the spacer means have coaxial rotatory axes. For this purpose, the spacer means may include an integral bush with the liquid applicator seated on the external periphery thereof, Preferably, the internal periphery of the bush is rotatably mounted on an axle of the applicator assembly.

The liquid applicator is preferably a unitary porous foam mass. Furthermore, the applicator may be resiliently compressible. High density polyurethane foam is the preferred material.

In accordance with a second aspect of the present invention there is provided an applicator assembly including:

a liquid applicator having an applicator surface to apply liquid from a source thereof;

an elongate stem having the liquid applicator arranged at one end, the stem being of sufficient length to enable the assembly to be grounded at the end with the applicator and held in the hand of an upright user at the other end; and a guard extending proximate the applicator surface such that with the stem arranged in an operative, substantially upright position with the guard disposed forwardly of the applicator, the guard extends beyond the applicator surface in the forward direction.

The guard preferably extends past the applicator surface when the stem is disposed at a substantially upright angle of 15° or less to the vertical.

Thus if the applicator assembly is used in the above manner for the administration of liquid herbicide, the guard will serve to protect the upright stem of any plants in the vicinity of the applicator assembly to guard against the likelihood of herbicide being applied to the stem of the plant. On the other hand, in the case of any upright plants considered to be undesirable by the user, these may be pushed aside by the forward path of the applicator assembly. In so doing, the guard of the applicator assembly intentionally bruises the cuticle or surfaces of the leaf or stem to facilitate the introduction of the herbicide to the undesirable plant.

The liquid applicator is preferably rotatably mounted relative to the guard so that it may roll relative to the ground applying herbicide to weeds or other plants in its path. For this reason, it is preferred that the liquid applicator is in the form of a cylindrical roller. The guard may thus comprise a bar extending parallel to the axis of the roller across the front of the roller. Alternatively, the guard may be in the form of an arcuate shell conforming to the contour of the applicator. For example, where the applicator is a cylindrical roller then the guard may comprise a part cylindrical shell corresponding to the curvature of the roller.

Preferably there are two guards one extending forwardly and one extending rearwardly. This enables the direction of operation of the applicator assembly to be reversed. In a most preferred form of the invention the stem is fixed relative to the guard or guards, If there are two guards, then it is most preferred that they are symmetrically arranged about a plane of symmetry extending through the stem. Advantageously, the guards form part of a housing receiving at least part of the liquid applicator.

In accordance with a third aspect of the present invention there is provided an applicator assembly including:

a liquid applicator having an applicator surface to apply liquid from a source thereof;

an elongate stem having the liquid applicator arranged at one end, the stem being of sufficient length to enable the assembly to be grounded at the end with the applicator and held in the hand of an upright user at the other end; and a guard extending proximate the applicator surface and over at least an upper portion of the applicator surface relative to the normal use orientation.

Preferably where the liquid applicator is a cylindrical roller with a cylindrical applicator surface, the guard is in the shape of an arcuate shell conforming to the shape of the cylindrical applicator surface. Preferably the arcuate shell extends over an angle of approximately 120 degrees.

The guard will thus provide a measure of protection to desirable plants which the user does not wish to eradicate. For example the applicator assembly can be used amongst flowers in a garden bed to eradicate weeds growing around the flowers. The weeds, if regularly checked, would normally be shorter than the flowers and thus the applicator assembly can be wiped over the weeds with the guard protecting against the applicator surface touching the underside of the flowers.

In accordance with a fourth aspect of the present invention there is provided an applicator assembly including:

elongate tubular reservoir for holding liquid, there being provided at one end of the reservoir, a liquid applicator for controlled application of liquid from the reservoir, the other end of the reservoir being provided with a funnel for ease of pour of liquid into the reservoir.

The funnel thereby enhances safety in dealing with toxic chemicals and reduces wastage.

In particular, although not exclusively, it is preferred that the elongate tubular reservoir is of sufficient length to enable the applicator assembly to be grounded at the end with the applicator, and held by an upright user at the other end.

The funnel may be integrally formed with the tubular reservoir. Alternatively, the funnel may be formed separately and affixed to the tubular reservoir.

Preferably, a screw closure is engageable with a complimentary thread in the throat of the funnel. This thread may be compatible with the standard thread provided on a bottle of pre-mixed herbicide. Moreover, the angle of taper on the funnel may also correspond to the angle of taper on the neck of the bottle of pre-mixed herbicide. The screw closure may be provided with an air valve to avoid creation of a vacuum in the elongate tubular reservoir.

The tubular reservoir is preferably transparent or at least translucent to enable the user to view its contents and in particular, to check the level of liquid remaining therein when the applicator assembly is in use. The material used in the tubular reservoir may also be antistatic and incorporate ultra-violet filters.

In accordance with a fifth aspect of the present invention there is provided a method of constructing an applicator assembly having a rotary applicator for applying liquid to a surface and an auxiliary roller to transfer liquid to the rotary applicator from a liquid reservoir, the method including:

forming the rotary applicator and the auxiliary roller from porous foam material with the auxiliary roller made from the centre of the rotary applicator;

assembling the applicator assembly with the surface of the auxiliary roller in contact with the cylindrical surface of the rotary applicator and in communication with the liquid reservoir.

Preferably the ends of the auxiliary roller are adjacent or substantially coterminus with respective ends of the rotary applicator.

Preferably the rotary applicator is cylindrical and additionally the auxiliary roller is also cylindrical. Advantageously, the auxiliary roller is cored from the rotary applicator in the centre thereof. The rotary applicator will thereby be provided with a central bore for insertion of an axle/bush assembly. The axle/bush assembly may form part of a housing with the auxiliary roller retained within the housing for engagement with the rotary applicator. Desirably, as the rotary applicator rotates in use, the auxiliary roller is driven to rotate as a consequence of it being engaged with the rotary applicator.

The rotary applicator and likewise the auxiliary roller may be formed of any porous foam material capable of absorbing liquid and applying it to a surface to be wetted by the liquid. Most preferably, the foam material is resiliently compressible ie elastomeric. One particular example is high density polyurethane foam.

In accordance with a sixth aspect of the present invention there is provided an air valve comprised of a thermoplastic rubber compound which is pliable and resilient, the valve incorporating two spaced opposed surfaces which converge towards each other to meet and lie flat against each other, a path for air extending between the two opposed surfaces, the path being operable under a slight pressure differential between one side of the valve and the other to allow for passage of air from said one side of the valve to the other in the direction in which the opposed surfaces converge.

Preferably the shore hardness of the thermoplastic rubber compound is in the range between 30 and 50 and the opposed surfaces lie flat against each other in the direction of the air path for a distance in the range of 0.2 mm to 0.5 mm. In particular, the distance is in the range of 0.3 mm to 0.35 mml. A valve so configured will resist passage of water through the valve in the opposite direction to the air flow path. Additionally, the use of a thermoplastic rubber compound will provide a thermally stable valve over of a large temperature range. The compound also has excellent elastic product memory with resistance to chemicals, solvents, herbicides formulations and ultraviolet light. A preferred thermoplastic rubber compound is Santoprene, a proprietary product of Monsanto Company. See also U.S. Pat. No. 4,104,210, the contents of which are incorporated herein by reference. The Santoprene may be injection moulded providing greater consistency and accuracy of the formed product compared to compression moulded compounds.

The two opposed surfaces may be defined by thin walls. Preferably the valve is integrally moulded and fully comprises the thermoplastic rubber compound. Ideally, the valve is injection moulded. The opposed surfaces may be defined during the moulding process including the path between the meeting portions. Alternatively, the valve may be moulded "closed" with a slit made therebetween the meeting portions to define a path therebetween for passage of air.

It will be appreciated that the part of the path extending between the meeting portions need not be a visible gap. In the normal configuration of the valve, the walls may seemingly provide no gap. However, the path is sufficient for passage of air. A small pressure differential on opposite sides of the meeting portion may be all that is required to effect the passage of air.

Preferably the path is defined by an opening at one end with the opposed surfaces lying against each other at the other end of the valve. A peripheral flange may surround the opening. Externally, the valve may be further provided with a necked region adjacent the flange to sealingly locate the valve in a circular valve seat conforming to the circumference of the necked region. The thin walls which internally define the opposed surfaces may also taper towards each other on the outside of the valve towards the end opposite the opening.

In accordance with a seventh aspect of the present invention there is provided a method of making an air valve, the method including:

forming the valve from a thermoplastic rubber compound which is pliable and resilient and further, forming the valve with a path for air extending therethrough and defined in part by two spaced opposed surfaces which converge towards each other and meet to lie flat against each other, with the path for air extending between the two meeting portions of the opposed surfaces, whereby the path is operable under a slight pressure differential between one side of the valve and the other to allow for passage of air from said one side of the valve to the said other in the direction in which the opposed surfaces converge.

In accordance with a eighth aspect of the present invention there is provided a flow control tap having an external threaded portion, in which the external threaded portion at least is made of a composition comprising: in combination, a thermoplastic rubber compound in the range of 15 to 35% w/w arid polypropylene in the range 65 to 85% w/w with the exclusion of polyethylene.

The elastic product memory of the external threaded portion has been found to be excellent and moreover, if the tap is used in a product assembled from plastic components using effective glues then the part is resistant to deterioration from the solvents in the glues, in particular the solvent gases expired by such glues. The tap, including an actuator portion is preferably integrally moulded from a composition having 17.5 percent thermoplastic rubber compound and 82.5 percent polypropylene. The thermoplastic rubber compound may be Santoprene a proprietary product of Monsanto Company, (see for example U.S. Pat. No. 4,104,210) with the additional polypropylene added thereto to bring the range of polypropylene within the range specified above.

The tap is preferably embodied in an applicator assembly having a complementary internal threaded portion for engagement with the external threaded portion of the tap. The material of the tap is therefore preferably softer than the body of the applicator assembly defining the internal thread to prevent stripping of the internal thread. Thus if the body of the applicator assembly is polycarbonate, the preferred range of polypropylene in the composition of the tap is 82.5% to 85%. If the body is of a softer material such as abs plastic, the proportion of polypropylene may be lower.

In accordance with a ninth aspect of the present invention there is provided a method of making a flow control tap including an external threaded portion, the method including the step of making the external threaded portion at least, from a composition which is a combination of thermoplastic rubber compound in the range of 15 to 35% and polypropylene in the range of 65 to 85%.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

In order that the invention may be more fully understood, one embodiment will now be described, by way of example with reference to the figures in which:

FIG. 1 is a front view of the applicator assembly in accordance with a preferred embodiment of the present invention;

FIG. 2 is a side view of the applicator assembly shown in FIG. 1;

FIG. 5a is a front view of a body forming part of the applicator assembly shown in FIG. 1;

FIG. 5b is a cross sectional view through b—b of FIG. 5a;

FIG. 5c is a side view of the body illustrated in FIG. 5a;

FIG. 5e is an end view of the body;

FIG. 6b is a side view of the spacer wheel illustrated in FIG. 6a;

FIG. 6c is an opposite end view to that shown in FIG. 6a;

FIG. 7b is a side view of the end cap illustrated in FIG. 7a;

FIG. 7c is a bottom view of the end cap illustrated in FIG. 7a;

FIG. 7d is a cross sectional view of the end cap illustrated in FIG. 7a;

FIG. 8a is a front view of a body end plate of the applicator assembly of FIG. 1;

FIG. 8b is a cross sectional view through b—b of FIG. 8a;

FIG. 8c is a side view of the body end plate of FIG. 8a;

FIG. 8d is a rear view of the body end plate shown in FIG. 8a;

FIG. 8e is an end view of the body end plate illustrated in FIG. 8a;

FIG. 9a is a side view of a flow control member of the applicator assembly shown in FIG. 1;

FIG. 9b is an end view of a flow control member illustrated in FIG. 9a;

FIG. 10b is a cross sectional view of the funnel illustrated in FIG. 10a;

FIG. 10c is a top view of the funnel illustrated in FIG. 10a;

FIG. 11b is a top view of the screw closure illustrated in FIG. 11a;

FIG. 12a is a side view of an air valve cooperable with the screw closure illustrated in FIG. 11a;

FIG. 12b is a cross sectional view of the air valve illustrated in FIG. 12a;

FIG. 12c is a top view of the air valve illustrated in FIG. 12a.

DESCRIPTION OF PREFERRED EMBODIMENT OF THE INVENTION

As illustrated in FIG. 1, the applicator assembly 10 includes an elongate stem 12 (only part of which is shown) having a rotary applicator 14 provided at one end and a funnel 16 provided at the other end. The elongate stem 12 is of sufficient length of approximately 1 meter (e.g. 950 mm) so that with the end of the assembly having the rotary applicator 14 engaged with the ground, an upright user operating the assembly is able to comfortably hold the funnel 16 or the stem 12 adjacent the funnel. The elongate stem 12 is tubular and serves as a reservoir for liquid to be applied by the rotary applicator 14.

Figure 3:
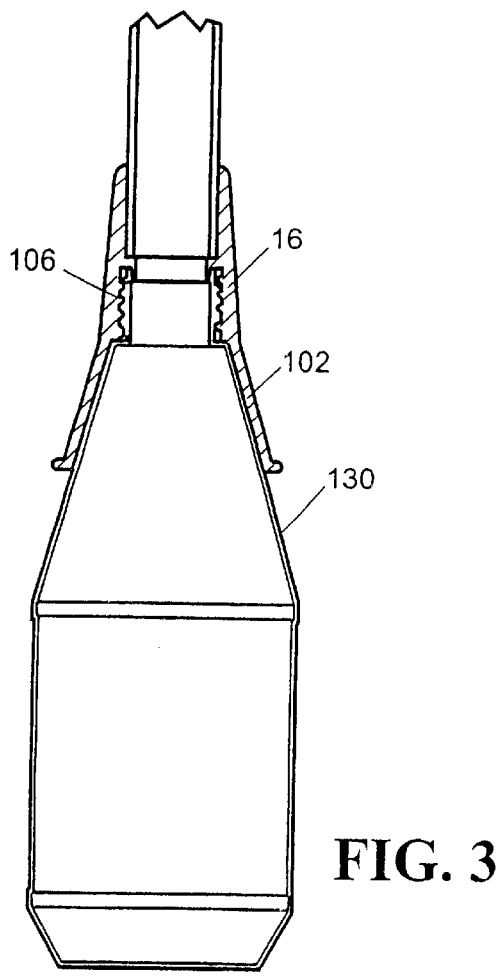
FIG. 3 is a cross sectional view facing the rear of the applicator assembly shown in FIG. 1, with a bottle removably engaged with the applicator assembly.

As can be seen more clearly in FIG. 3, the rotary applicator 14 is cylindrical to provide a cylindrical applicator surface 20. The rotary applicator 14 has a central bore 22 extending therethrough.

Fluid is applied to the rotary applicator 14 by means of an auxiliary roller 25. The auxiliary roller 25 is in contact with the cylindrical applicator surface 20 to transfer liquid from the surface of the auxiliary roller 25 to the cylindrical applicator surface 20. The rotary applicator 14 and the auxiliary roller 25 are both constructed of porous resiliently compressible materials such as high density polyurethane foam. In particular, the auxiliary roller 25 is cut to produce the central bore 22 of the rotary applicator 14 for economic use of the material.

The high density polyurethane foam used to produce the rollers has a density index of 16 kg±15% measured according to the following testing regime:

compress sample until no closed cells are apparent;

condition samples for at least 1 hour at 23±2° C. and 55±5% relative humidity;

set indentometer with 200 mm foot to speed of 250 mm/min and a load of −0.5 kg;

bear foot on sample pad until load is 0.0 kg; indent sample by 25% of current pad thickness; and record load in kilograms after 30 seconds.

From FIG. 3, it can be seen that the auxiliary roller 25 is in fluid communication with the reservoir provided by elongate tubular stem 12 by means of conduit 27. This aspect will be explained further in connection with FIG. 5.

Figure 6A:
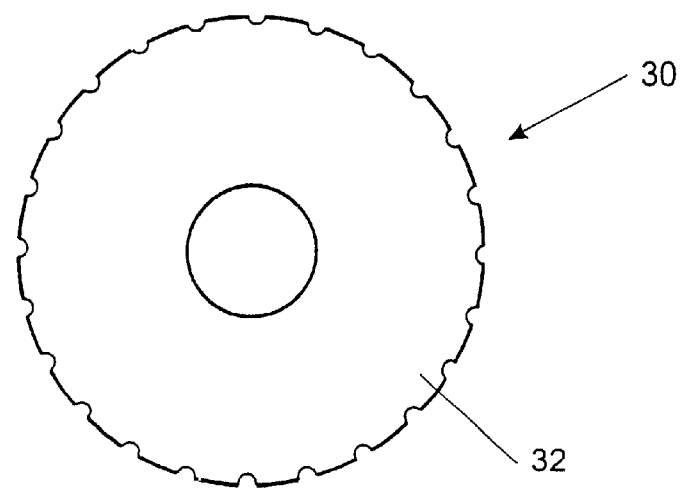
FIG. 6a is an end view of a spacer wheel forming part of the applicator assembly shown in FIG. 1.
Figure 6B:
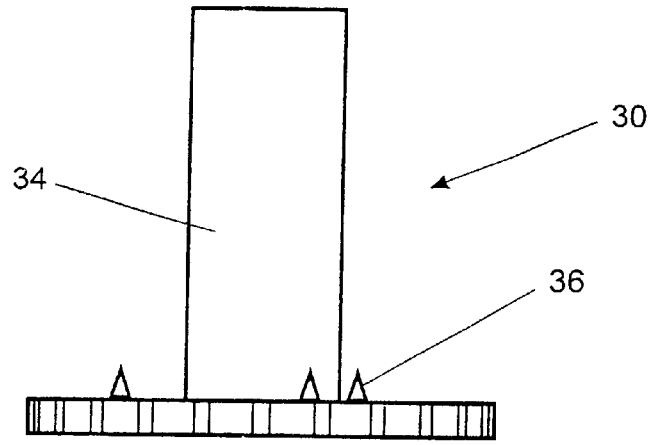
Figure 6C:
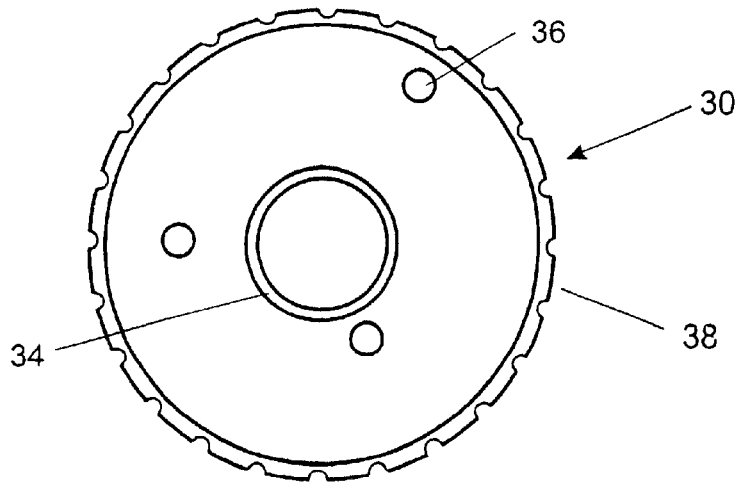
Figure 7A:
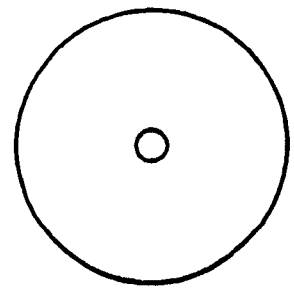
FIG. 7a is a top view of a retaining cap of the applicator assembly shown in FIG. 1.
Figure 7B:
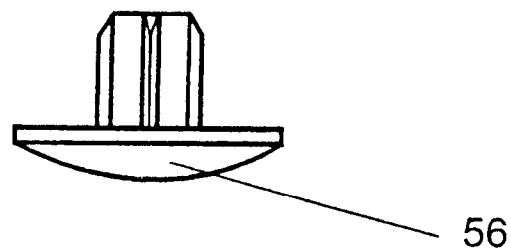
Figure 7C:
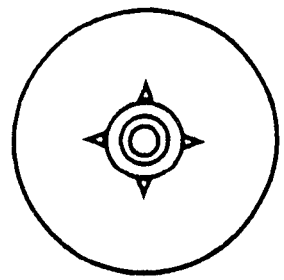
Figure 7D:
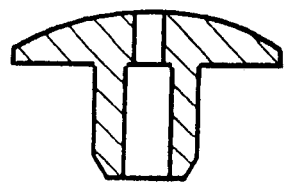
Figures 8A, 8B, 8C, 8D:
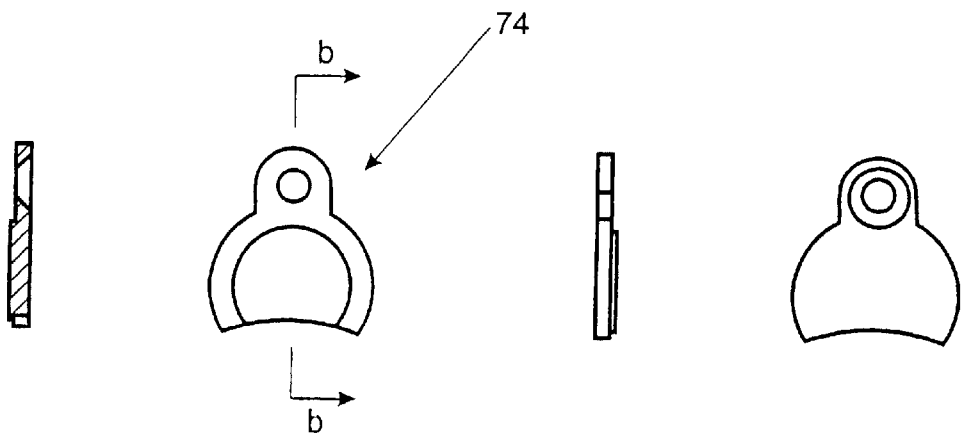
Figure 8E:
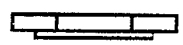

The rotary applicator 14 is disposed alongside a spacer wheel 30 as shown in FIG. 3 and as illustrated in more detail in FIGS. 6a–6c. The spacer wheel 30 comprises a unitary assembly of a planar circular portion 32 and a tubular bush portion 34 extending coaxially from one side of the planar circular portion 32. The spacer wheel 30 is constructed of polycarbonate material known for its good wear properties. Three spikes 36 extend from the planar circular portion 32 on the same side thereof as the tubular bush portion 34. The spikes 36 engage into the resiliently compressible foam material of the rotary applicator 14 to resist relative rotation between the spacer wheel and the rotary applicator 14.

As can be seen from FIG. 3, the circular portion 32 extends radially beyond the cylindrical applicator surface 20. The effect of this is that when the applicator assembly 10 is used against a hard relatively flat surface such as concrete or a roadway, the circumferential surface 38 of the spacer wheel 20 will engage with the ground surface. The cylindrical applicator surface 20 which is located only two or three millimeters radially inward from the circumferential surface 38 will engage with any weeds which extend above the ground surface. Thus, if there are no weeds present, the herbicide will not be wasted on the ground surface, reducing the consumption of herbicide and limiting the amount of herbicide being introduced into the environment. Additionally, the circumferential surface 38 will bear against any hard ground surfaces thereby reducing wear on the cylindrical applicator surface 20. The circumferential surface 38 may also be provided with evenly spaced indentations as illustrated in FIG. 6c to increase grip on the hard ground surface.

At the end of the rotary applicator 14 opposite the spacer wheel 30, is an end surface 40, The end surface 40 and the cylindrical applicator surface 20 together define an external edge 42. The end surface 40 and the applicator surface 20 are exposed adjacent the edge 42 along an outermost portion of that edge 42. It will be understood that as the rotary applicator 14 rotates on its mounting, some portions of the end surface 40 or the applicator surface 20 might be concealed by portions of the applicator assembly 10. The outermost portions will present a free edge which is able to be used for spot-weeding, that is, dabbing the liquid herbicide onto weeds to be eradicated.

Figure 4:
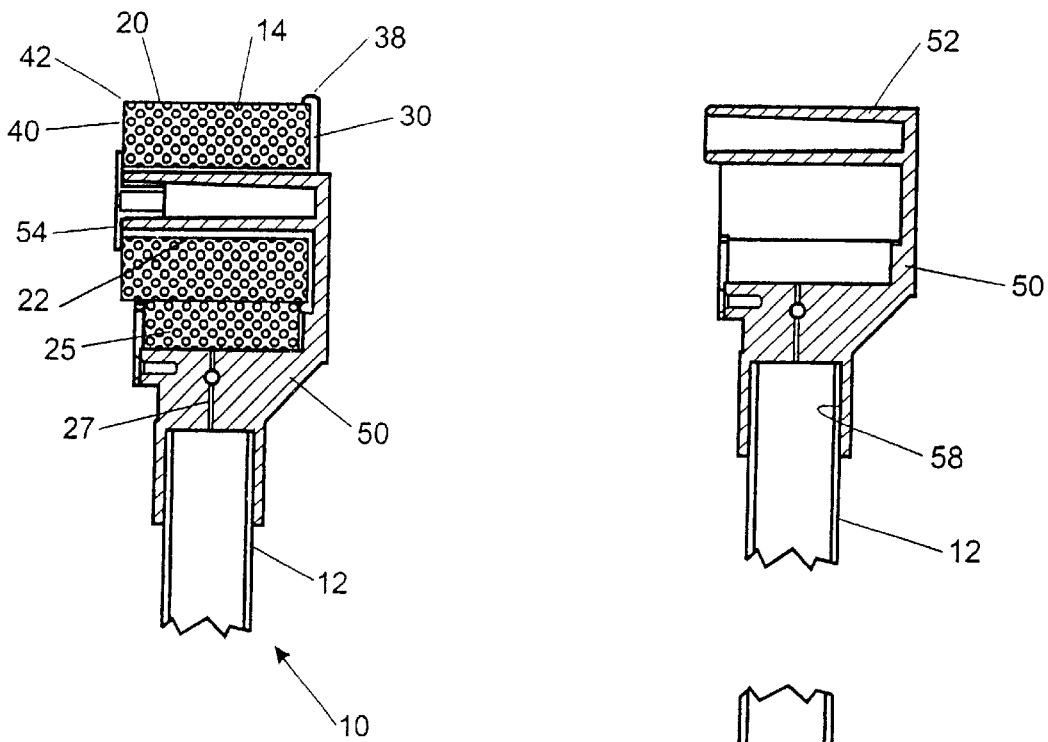
FIG. 4 is a cross sectional view similar to FIG. 3 but without the bottle and without the rotary applicator.
Figure 4:
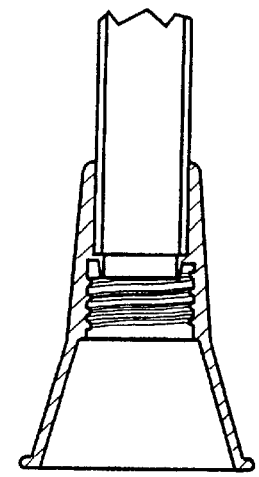

FIGS. 3 and 4 illustrate a body 50 mounted at the end of the elongate stem 12. The body 50 provides a rotatable mounting for the rotary applicator 14. The form of the body is also illustrated in detail in FIGS. 5a–5d. As can be seen most clearly in FIG. 4, the body 50 provides an axle portion 52 of tubular form. The axle portion 52 is sized to be inserted into the tubular bush portion 34 of the spacer wheel 30 with a sliding fit provided therebetween. An end cap 54 as shown in FIG. 3 frictionally engages with the internal periphery of axle portion 52. The end cap 54 has a large relatively flat circular head portion 56 as shown in FIGS. 7a–7d which abuts against the end surface 40 of the rotary applicator 14 to retain the rotary applicator 14 and associated spacer wheel 30 in position.

Referring to FIGS. 4 and 5a–5d, the body 50 has a cylindrical recess 58 to receive the end of elongate stem 12. The elongate stem 12 and the body 50 are glued together.

The body 50 also includes arcuate guards 60. These arcuate guards 60 conform to the contour of the cylindrical applicator surface 20. The two guards 60 are symmetrical about a plane of symmetry 64 aligned with the longitudinal axis of the elongate stem 12. The ends of the arcuate guards 60 are provided with respective ridges 66. When the applicator assembly 10 is in use, for some upright operating angles at least, the ridge 66 which is forward in use will extend beyond the cylindrical applicator surface 20 in the forward direction relative to the user. Thus, when the applicator assembly 10 approaches the stem of a plant which the user does not wish to eradicate then the edge of the guard defined by ridge 66 will provide a measure of protection against applying herbicide to the plant. Additionally, in connection with use of the applicator assembly 10 against any plants which are to be destroyed, the forward ridge will serve to bruise the plant cuticle making the application of herbicide more effective.

Figure 5D:
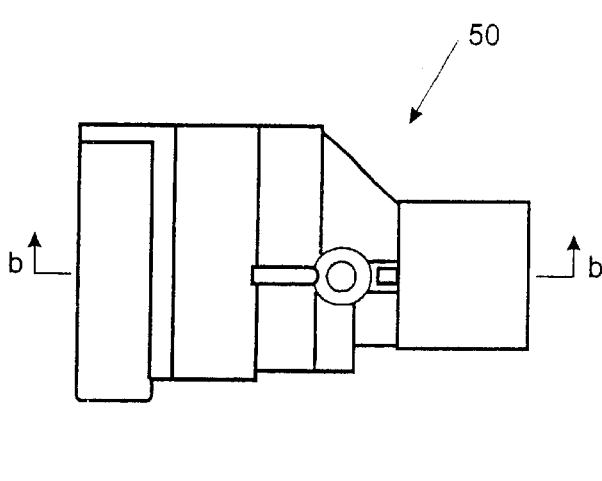
FIG. 5d is a cross section through d—d of FIG. 5e.
Figure 5D:
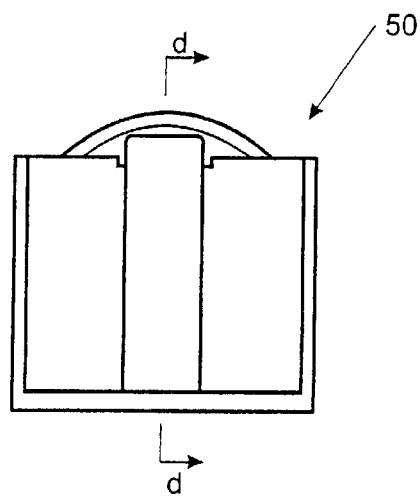
Figure 5D:
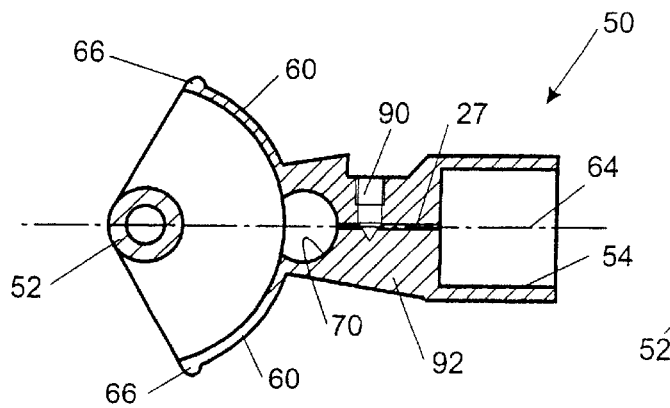
Figure 5D:
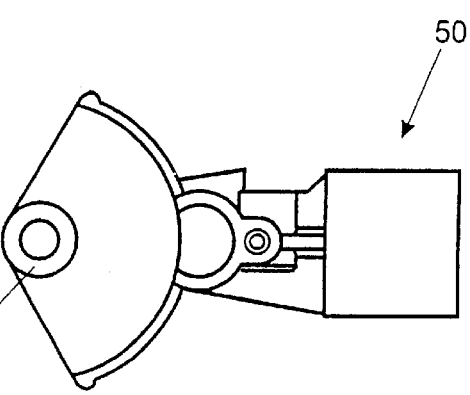
Figure 5D:
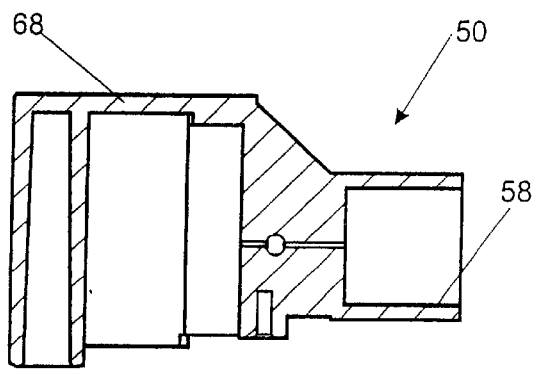

The arcuate guards 60 are joined by an end wall portion 68 as illustrated in FIG. 5d. The end wall portion 68 together with the arcuate guards 60 define a partial housing to receive the rotary applicator 14 and the spacer wheel 30.

As previously mentioned, the auxiliary roller 25 is held in contact with the cylindrical applicator surface 20. The body 50 provides a part cylindrical recess 70 as illustrated in FIG. 5b to receive the auxiliary roller 25. One end of the part cylindrical recess 70 is closed by the end wall portion 68 of the body 50. The other end is open as illustrated in FIG. 5c. A body end cap 74 as illustrated in FIGS. 8a–8e is provided to close the cylindrical recess 70 at the other end. The auxiliary roller 25 is inserted before the body end cap 74 is attached by means of a screw fastener (not shown).

In view of the frictional surface contact between the auxiliary roller 25 and the rotary applicator 14, as the rotary applicator 14 rotates the auxiliary roller 25 will be caused to rotate in the opposite rotational direction. As previously mentioned, conduit 27 fluidly connects the liquid reservoir provided in elongate stem 12 to the auxiliary roller 25. In normal usage, the applicator assembly 10 is used with the rotary applicator 14 lowermost so that gravity will cause fluid to flow from reservoir along conduit 27 to the auxiliary roller 25. As the auxiliary roller 25 and the rotary applicator 14 rotatingly engage, liquid be transferred from the auxiliary roller 25 to the rotary applicator 14.

Figures 9A, 9B:
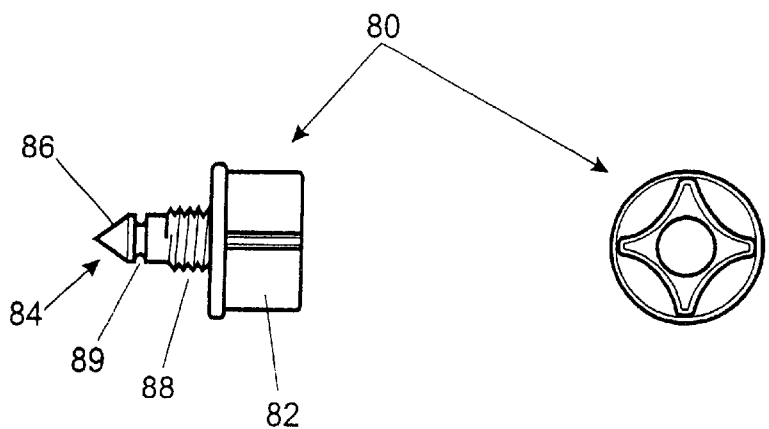

However, it will be desirable at certain times to cease the flow between the reservoir and the rotary applicator 14. For example, the user may have finished work for the day without exhausting the supply of liquid herbicide in the reservoir. Furthermore, it will be understood that the flow rate through the conduit 27 will not be always constant under all operating conditions and temperatures. Accordingly, it will be necessary to bring about adjustment of the flow rate through the conduit 27. This closing and adjustment of the conduit 27 is effectively achieved by the flow control member 80 illustrated in FIGS. 9a and 9b. The flow control member 80 comprises a knob portion 82 operable by the user and a stopper portion 84 in the form of a projection having a conical end face 86 and an external thread 88 adjacent the knob portion 82. Additionally, the stopper portion 84 is provided with a circumferential recess 89 adjacent the conical end face 86. The circumferential recess 89 receives an annular washer (not shown).

The flow control member 80 engages in a complimentarily shaped recess 90 provided in the body. The recess 90 is also provided with an internally threaded portion threadingly engageable with externally threaded portion 88 on the flow control member 80. The recess 90 intersects the conduit 27 so that when the stopper portion 84 is fully inserted into recess 90, flow along conduit 27 will be interrupted. By unscrewing the flow control member by a sufficient amount e.g. through a half turn, the flow through conduit 27 will resume. Positions of the flow control member 80 between open and closed will cause varying amounts of impedance to the flow through conduit 27 and thus provide the necessary adjustment of the flow to meet different operating conditions. For example, when a thick patch of weeds is encountered, the user may turn the flow control member 80 to enable full flow so that sufficient herbicide is provided to the rotary applicator 14 for application of an effective amount of herbicide to the weeds and to keep the rotary applicator moist. The annular washer (not shown) inserted into circumferential recess 89 prevents liquid from leaking out along recess 80 to the exterior of the body 50.

Although not illustrated in the figures, the body 50 might also include an aperture through web portion 92 (see FIG. 5b) to enable the applicator assembly 10 to be suspended from a hook when not in use.

Several of the parts of the applicator assembly 10 are glued together, in particular the elongate stem 12 and the body 50 and the elongate stem 12 and the funnel 16. Such glue generally includes solvents which a detrimental to certain plastics including ABS and polycarbonates. The solvents can be expirated into gaseous form and thereby come into contact with any parts along elongate stem 12 and conduit 27. The flow control member 80 in recess 90 will be particularly susceptible to damage if constructed from certain plastics. Therefore, the flow control member has been constructed from a composite of 17.5% thermoplastic rubber compound and 82.5% polypropylene. Polypropylene has resistance to these glue solvents.

Figure 10A:
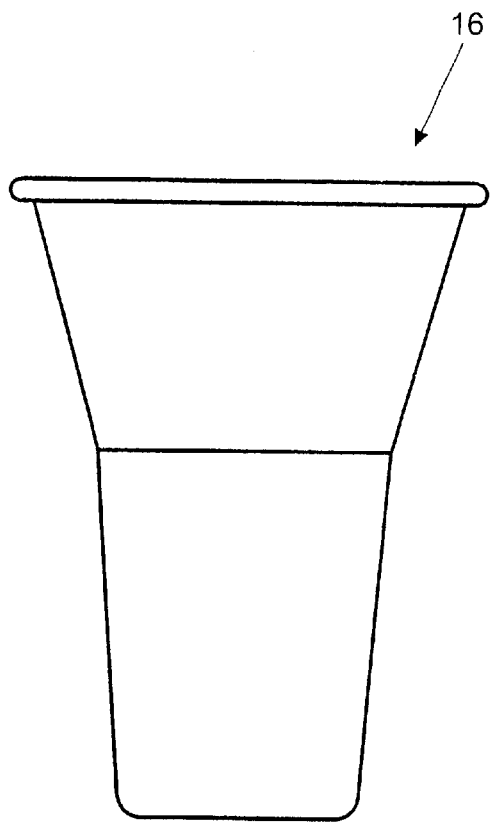
FIG. 10a is a side view of a funnel of the applicator assembly illustrated in FIG. 1.
Figure 10B:
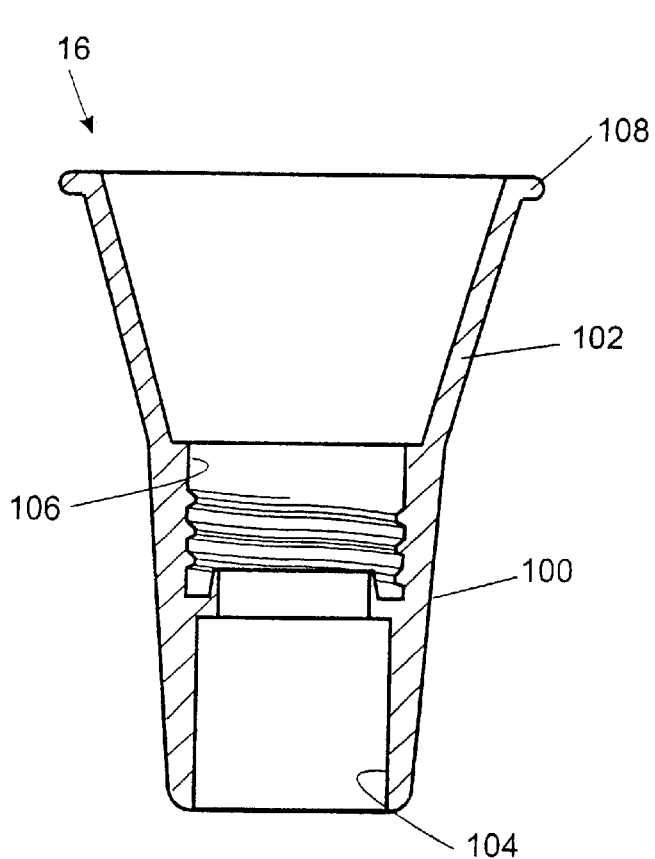
Figure 10C:
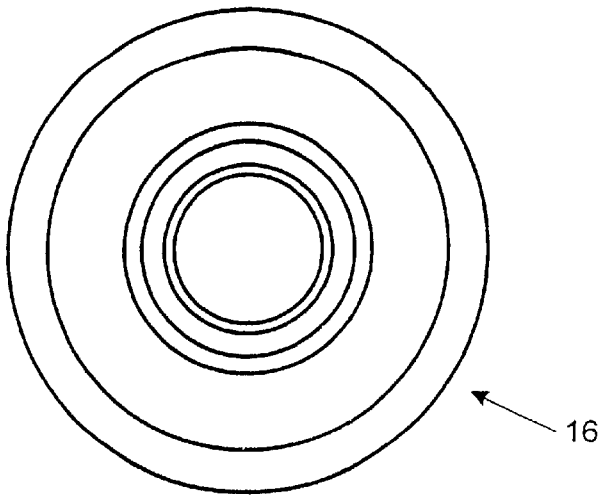

As previously mentioned, at the other end of the elongate stem 12 to the rotary applicator 14, a funnel 16 is provided as shown clearly in FIGS. 10a–10c. The funnel 16 is tubular in form with a first attachment portion 100 and a second funnel portion 102. The exterior periphery of the first portion 100 is frustoconical in shape with increasing diameter towards the funnel portion 102. The first portion 100 includes a cylindrical recess 104 for insertion of the end of the elongate stem 12. The elongate stem 12 is glued therein.

The cylindrical recess 104 communicates with an internally threaded portion 106 also provided within the first portion 100. The threaded portion 106 in turn communicates with the internal periphery of funnel portion 102. The funnel portion 102, threaded portion 106 and cylindrical recess 104 have their central axis aligned. The outer edge of the funnel portion 102 is provided with a strengthening lip 108.

Figure 11B:
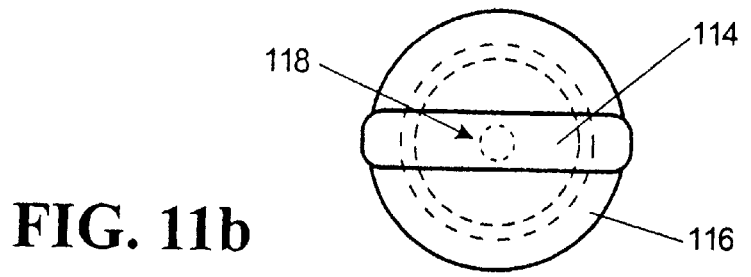
Figure 11A:
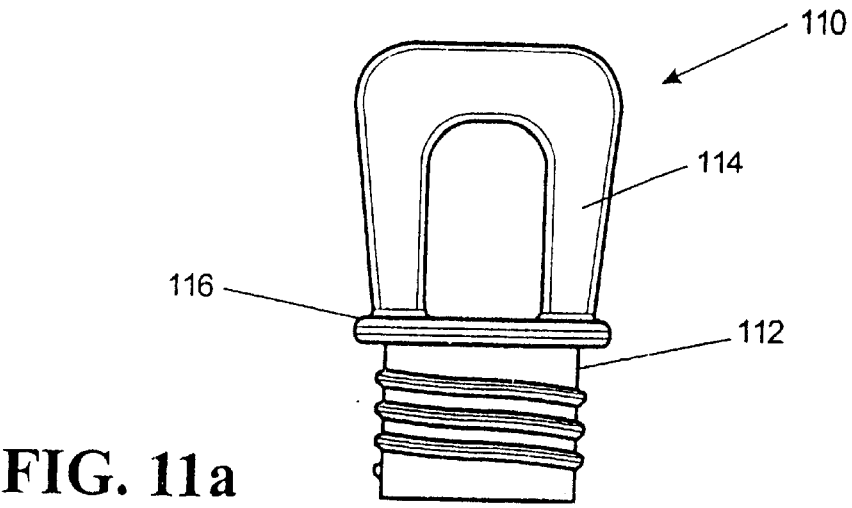
FIG. 11a is a side view of a screw closure adapted to engage with the funnel illustrated in FIG. 10.

A screw closure 110 illustrated in FIGS. 11a–11b is insertable into the funnel 16. The screw closure 110 has an externally threaded portion 112 and a U shaped handle portion 114. The externally threaded portion 112 is tubular in form including cover 116. Centrally located in the cover is an aperture 118. The aperture 118 allows for passage of air through the screw closure 110 and into the interior of the elongate stem 12. Since the tubular elongate stem 12 serves as a reservoir for liquid to be applied by the applicator assembly, as the liquid level drops it will be necessary to introduce air into the elongate stem 12. Without sufficient head pressure above the liquid level, the liquid in the reservoir will not drain effectively from the liquid reservoir. However it is undesirable to have an aperture which enables liquid to spill out during use such as in the event of the applicator assembly 10 being unintentionally dropped.

Figures 12A, 12B, 12C:
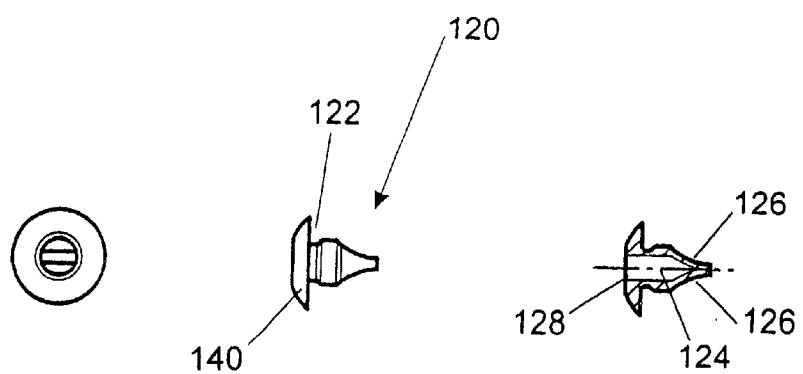

The one way valve 120 illustrated in FIGS. 12a–12c is inserted into the aperture 118 and allows for passage of air therethrough while minimising the likelihood of liquid flowing back out through the aperture 118. The air valve 120 has an air path 124 extending therethrough which in part is defined by two spaced opposed wall surfaces 126 inclined towards each other. The wall portions 126 meet to lie flat against each other whilst still allowing an air path therebetween. The extent to which the wall portions 126 lie flat against each other extends for a distance in the range between 0.3 mm and 0.5 mm along the direction of the air path 124.

At the other end of the air valve 120 is an opening 128 to the air path 124 with a peripheral flange 140 extending around the opening. Beneath the flange is a necked region 122 to sealingly locate the one way valve 120 within the aperture 128.

The air valve 120 is constructed of an injection moulded thermo plastic rubber compound with a shore hardness in the range between 30 and 50. This provides an air valve which is thermally stable and hence operable over a large range of temperatures. It has been found to be operable at temperatures below freezing. The compound has an excellent product memory and is resistant to chemicals, solvents and herbicide formulations and ultraviolet light. Moreover, the air valve is operable to allow for passage of air under only a slight pressure differential while still effective to prevent liquids from flowing back out through the valve. Thus in normal use under atmospheric pressure, a slight drop in pressure within the stem 12 as liquid leaves the stem 12 via applicator 14 is all that is required to draw in air through the valve 120 along air path 124.

The internally threaded portion 106 of the funnel 116 has been designed to be cooperable with the external thread on common plastic containers, particularly those containing pre mixed herbicide formulations. Thus, as shown in FIG. 3, a bottle containing pre mixed herbicide formulation may be screwed into the internally threaded portion 106 of the funnel 116 and retained there until the liquid supply from the bottle 130 has been fully exhausted. The air contained in bottle 130 has been found to be sufficient to enable full draining of liquid within the reservoir sourced from bottle 130. As can be seen in FIG. 3, the internal periphery of the funnel portion 102 is complimentary to that of the neck of bottle 130 containing pre mixed herbicide formulation.

The foregoing describes only one embodiment of the present invention and modifications may be made thereto without departing from the scope of the present invention.

What is claimed is:

1. An applicator assembly comprising:
   a body;
   a substantially cylindrical liquid applicator rotatably mounted to the body and having a central longitudinal axis, the liquid applicator comprising a first end face, an opposing second end face, and a substantially cylindrical applicator surface extending therebetween, at least a portion of the applicator surface extending along the length of the liquid applicator having a constant radius from the central longitudinal axis; and
   a spacer rotatably mounted to the body adjacent to the second end face of the liquid applicator, the spacer comprising a circular disk having a front face and a rear face, the front face being disposed adjacent the second end face of the liquid applicator, the front face of the spacer having disposed thereon a plurality of spikes that extend so as to penetrate the second end face of the liquid applicator, the spacer having an outside edge that extends beyond the applicator surface of the liquid applicator.

2. An applicator assembly as defined in claim 1, wherein the entire applicator surface along the length of the liquid applicator has a constant radius from the central longitudinal axis.

3. An applicator assembly as defined in claim 1, further comprising a bush rotatably mounted to the body, the liquid applicator encircling and being seated on the bush.

4. An applicator assembly as defined in claim 1, wherein the spacer is connected with the liquid applicator so that the spacer and liquid applicator rotate in unison.

5. An applicator assembly as defined in claim 1, wherein the liquid applicator is comprised of a resiliently compressible, porous foam material.

6. An applicator assembly as defined in claim 1, wherein the liquid applicator is comprised of high density polyurethane foam.

7. An applicator assembly as defined in claim 1, wherein the outside edge of the spacer extends from about 1 to 2 millimeters beyond the applicator surface.

8. An applicator assembly comprising:
   a body;
   a bush being rotatably mounted to the body;
   a tubular primary liquid applicator encircling the bush in direct contact therewith, the primary liquid applicator comprising a first end face, an opposing second end face, and an applicator surface extending therebetween, the primary liquid applicator being comprised of a resiliently compressible, porous foam material throughout and being selectively removable from the bush;
   a secondary liquid applicator rotatably mounted to the body so as to bias against the applicator surface of the primary liquid applicator; and
   a spacer disk being disposed adjacent to the second end face of the primary liquid applicator, the spacer disk having an outer edge that extends beyond the applicator surface of the primary liquid applicator.

9. An applicator assembly as defined in claim 8, wherein the primary liquid applicator has a substantially cylindrical configuration with a central longitudinal axis extending therethrough.

10. An applicator assembly as defined in claim 9, wherein the entire applicator surface along the length of the primary liquid applicator has a substantially constant radius from the central longitudinal axis.

11. An applicator assembly as defined in claim 8, wherein the spacer disk is integrally formed with and radially outwardly projects from the bush.

12. An applicator assembly as defined in claim 8, wherein the body further comprises an axle, the bush being rotatably mounted about the axle.

13. An applicator assembly as defined in claim 8, further comprising one or more spikes projecting from the spacer disk into the primary liquid applicator.

14. An applicator assembly as defined in claim 8, wherein the secondary liquid applicator is comprised of a resiliently compressible, porous foam material.

15. An applicator assembly as defined in claim 8, wherein the primary liquid applicator is comprised of high density polyurethane foam.

16. An applicator assembly as defined in claim 8, further comprising an elongated stem attached to the body, the stem bounding a cavity adapted to hold a liquid, the cavity being in fluid communication with the secondary liquid applicator.

17. An applicator assembly as defined in claim 8, wherein the outside edge of the spacer extends from about 1 to 2 millimeters beyond the applicator surface of the primary liquid applicator.

18. An applicator assembly as defined in claim 8, further comprising a plurality of grooves formed on the outer edge of the spacer disk.

19. An applicator assembly comprising:

a body having an axle;

a spacer assembly comprising:

a tubular bush rotatably disposed about the axle; and an annular spacer disk radially outwardly projecting from the bush to an outer edge;

a primary liquid applicator encircling the bush so as to rotate in unison with the spacer assembly, the primary liquid applicator comprising a first end face, an opposing second end face disposed adjacent to the spacer disk, and a substantially cylindrical applicator surface extending between the first end face and the second end face, the outer edge of the spacer disk extending beyond the substantially cylindrical applicator surface, the tubular liquid applicator being comprised of a resiliently compressible, porous foam material; and a secondary liquid applicator rotatably disposed on the body, the secondary liquid applicator having an applicator surface biased against the applicator surface of the primary liquid applicator.

20. An applicator assembly as defined in claim 19, wherein the primary liquid applicator has a central longitudinal axis extending therethrough, the radius between the central longitudinal axis and the applicator surface being constant along the length of the primary liquid applicator.

21. An applicator assembly as defined in claim 19, further comprising one or more spikes projecting from the spacer assembly into the primary liquid applicator.

22. An applicator assembly as defined in claim 19, wherein the primary liquid applicator is comprised of high density polyurethane foam.

23. An applicator assembly as defined in claim 19, wherein the primary liquid applicator is removably mounted to the spacer assembly.

24. An applicator assembly as defined in claim 19, wherein the secondary liquid applicator is comprised of a resiliently compressible, porous foam material.

25. An applicator assembly as defined in claim 19, further comprising an elongated stem attached to the body, the stem bounding a cavity adapted to hold a liquid, the cavity being in fluid communication with the secondary liquid applicator.

* * * * *